United States Patent [19]
Harada et al.

[11] Patent Number: 5,624,991
[45] Date of Patent: Apr. 29, 1997

[54] POLYPROPYLENE RESIN COMPOSITION

[75] Inventors: Hiroyuki Harada, Ichihara; Yuji Ikezawa, Nagoya; Susumu Kanzaki, Ichihara; Hideo Shinonaga, Chiba; Satoru Sogabe, Sodegaura, all of Japan

[73] Assignee: Sumitomo Chemical Company Limited., Osaka, Japan

[21] Appl. No.: 327,714

[22] Filed: Oct. 24, 1994

[30] Foreign Application Priority Data

Nov. 1, 1993 [JP] Japan ................... 5-273665

[51] Int. Cl.$^6$ ................... C08L 23/14; C08L 53/00
[52] U.S. Cl. ................... 524/451; 528/88; 528/240
[58] Field of Search ................... 524/451; 525/88, 525/240

[56] References Cited

U.S. PATENT DOCUMENTS

| | | | |
|---|---|---|---|
| 5,308,908 | 5/1994 | Fukui | 524/451 |
| 5,374,677 | 12/1994 | Nishio | 524/451 |

FOREIGN PATENT DOCUMENTS

| | | |
|---|---|---|
| 0256724 | 2/1988 | European Pat. Off. . |
| 0509662 | 10/1992 | European Pat. Off. . |
| 0519725 | 12/1992 | European Pat. Off. . |
| 0531054 | 3/1993 | European Pat. Off. . |
| 0072042 | 6/1981 | Japan . |
| 0021448 | 2/1982 | Japan . |
| 0042643 | 5/1983 | Japan . |
| 0147045 | 8/1984 | Japan . |
| 1264012 | 11/1986 | Japan . |
| 2095334 | 5/1987 | Japan . |

*Primary Examiner*—Irina S. Zemel
*Attorney, Agent, or Firm*—Sughrue, Mion, Zinn, Macpeak & Seas

[57] ABSTRACT

A polypropylene resin composition, which exhibits an excellent coating adherence, high rigidity, high impact strength at low temperatures, prominent heat resistance and excellent appearance of moldings even without effecting a treatment with trichloroethane as a pretreatment step before coating, comprises 30 to 92% by weight crystalline ethylene propylene block copolymer (A), 5 to 30% by weight ethylene-α olefin copolymer rubber (B), 3 to 20% by weight ethylene-butene-1 copolymer (C) having the following characteristics:

(C1) a density of 0.870 to 0.915 g/cm$^3$, (C2) a melt index at 190° C. of 5 to 30 g/10 minutes, and (C3) a melt peak at 100° C. or higher as determined in the thermogram with increasing temperature by a Differential Scanning Calorimeter (DSC), and 0 to 20% by weight inorganic filler (D).

6 Claims, No Drawings

1

POLYPROPYLENE RESIN COMPOSITION

BACKGROUND OF THE INVENTION

1. Field of the Invention

The present invention relates to a polypropylene resin composition for coating the exterior parts of automobiles which can afford an excellent coating adherence, a high rigidity, high impact strength at low temperatures, prominent heat resistance and an excellent appearance to moldings even without effecting a pretreatment step, i.e., treatment with trichloroethane before coating.

2. Description of the Related Art

Recently automotive parts have been made to have an increasingly thinner wall thickness as an increasingly larger type of automobile having a lighter weight has been manufactured, so that there is a need for coating materials, which enable coatings excellent in heat resistance, impact strength at low temperatures, and in appearance of moldings.

There have been heretofore proposed for such materials numerous compositions comprising a combination of crystalline polypropylenes with rubber and inorganic fillers. However, most exterior parts of automobiles are likely to be attached in place after painted to have brilliant and high grade perception. Current techniques for the paintings employ the steps of treating moldings with a vapor of 1,1,1-trichloroethane normally for 30 seconds to degrease and etch, then undercoating with a primer, and then applying a polyurethane paint as overcoating.

Japanese Patent KOKAI (Laid-open) No. 63-128045 discloses an improved coating composition comprising a polypropylene polymer composition having an excellent adhesiveness with polyurethanes as overcoating even without using any primer. In this patent, however, a treatment with a vapor of 1,1,1-trichloroethane is required.

The use of 1,1,1-trichloroethane was restricted and decided to be entirely inhibited until the end of 1995, together with the flon gas regulation, by the conference held in Montreal September, 1991. Therefore, coating materials for automotive parts simply having rigidity, strength, heat resistance and impact strength at low temperatures are not sufficient to cope with the regulations unless they allow achivement of enhanced coating adherence even omitting the treatment with 1,1,1-trichloroethane. Development of such coating materials has been vigorously desired.

As a result of our intensive research made to overcome the difficulties as described above, it has been found that they can be overcome by using a specific polypropylene resin composition having specific components, based on which the present invention has been completed.

SUMMARY OF THE INVENTION

In view of the aforementioned circumstances in the art, an object of the present invention is to provide a polypropylene resin composition for coating the surfaces of exterior parts of automobiles which is excellent in coating adherence, rigidity, impact strength at low temperatures, heat resistance and appearance of moldings even omitting a pretreatment step of treating the parts with 1,1,1-trichloroethane before painting.

That is, an object of the present invention is to provide a polypropylene resin composition comprising 30 to 92% by weight crystalline ethylene propylene block copolymer(A), 5 to 30% by weight ethylene-α olefin copolymer rubber (B), 3 to 20% by weight ethylene-butene-1 copolymer (C) having the following characteristics:

(C1) a density of 0.870 to 0.915 g/cm$^3$, (C2) a melt index at 190° C. of 5 to 30 g/10 minutes, and (C3) a melt peak at 100° C. or higher as determined in the thermogram with increasing temperature by a Differential Scanning Calorimeter (DSC), and 0 to 20% by weight inorganic filler (D).

Another object of the present invention is to provide a polypropylene resin composition, wherein the crystalline ethylene propylene block copolymer (A) has a crystalline polypropylene moiety and an ethylene-propylene random copolymer moiety in a ratio of ethylene/propylene of 20/80 to 60/40 by weight, said crystalline polypropylene moiety having a limiting viscosity [η]p of 0.8 to 2.0 dl/g and a ratio of molecular weight distribution, Q value=weight average molecular weight Mw/number average molecular weight Mn, of 3.0 to 5.0 as determined by GPC, and a content of solubles in xylene at 20° C. of not higher than 1.5% by weight, and said ethylene-propylene random copolymer being present in an amount of 5 to 20% by weight of said crystalline ethylene propylene block copolymer (A).

Still another object of the present invention is to provide a polypropylene resin composition, wherein the ethylene-α olefin copolymer rubber (B) has a Mooney viscosity $ML_{1+4}$ measured at 100° C. of 8 to 100 and a content of α olefin of 10 to 55% by weight.

DETAILED DESCRIPTION OF PREFERRED EMBODIMENTS

The present invention is practically described hereunder.

Crystalline ethylene propylene block copolymers (A) of the present invention may be produced usually by two-step polymerization of propylene and then a mixture of ethylene and propylene in the presence of Ziegler-Natta catalyst, a combination of titanium chloride and an alkyl aluminum compound. In practice of the present invention, it is preferred to use a catalyst comprising a complex of titanium trichloride and magnesium with an electron-donor organic compound. A process of producing this catalyst is described in detail in, for example, Japanese Patent KOKAI No. 61-218606.

The proportion of crystalline ethylene propylene block copolymer (A) to be incorporated in the polypropylene resin composition of the present invention is from 30 to 92% by weight, preferably 50 to 85% by weight. If the proportion is lower than 30% by weight, the resultant moldings may be degraded in appearance, especially flow mark, rigidity, and heat resistance. On the other hand, if the proportion is in excess of 92% by weight, the coated moldings may be reduced in impact strength at low temperatures and coating adherence.

The crystalline ethylene propylene block copolymer (A) to be preferably used has a moiety of crystalline polypropylene and another moiety of ethylene-propylene random copolymer in a ratio of ethylene/propylene=20/80 to 60/40 (by weight), said crystalline polypropylene moiety having a limiting viscosity [η]p of 0.8 to 2.0 dl/g and a ratio of molecular weight distribution, Q value=weight average molecular weight Mw/number average molecular weight Mn, of 3.0 to 5.0 as determined by GPC and a content of solubles in xylene at 20° C. of not higher than 1.5% by weight, said ethylene-propylene random copolymer being in an amount of 5 to 20% by weight of the crystalline ethylene propylene block copolymer (A).

The ratio in ethylene/propylene of the ethylene-propylene random copolymer moiety should be 20/80 to 60/40, preferably 20/80 to 50/50 by weight. If the amount of ethylene is less than 20% by weight, the composition may have a reduced rigidity and a lower impact strength at low temperatures, while it is over 60% by weight, the impact strength at low temperatures, coating adherence and appearance of moldings, especially flow mark of the resultant composition are degraded.

The proportion of the moiety of ethylene-propylene random copolymer should be from 5 to 30% by weight, preferably 7 to 25% by weight of the crystalline ethylene-propylene block copolymer (A). A proportion of less than 5% by weight results in an reduction in impact strength at low temperatures and coating adherence, while a proportion of higher than 30% by weight results in an reduction in rigidity and heat resistance.

The limiting viscosity [η]p of the crystalline polypropylene moiety in tetralin at 135° C. should be 0.8 to 2.0 dl/g. If the [η]p is lower than 0.8 dl/g, the tensile elongation, impact strength at low temperatures and coatability may be reduced, while if it is higher than 2.0 dl/g, the flowability of the composition may markedly be diminished and the coatability, appearance, especially flow mark of moldings also may be degraded.

The ratio of molecular weight distribution, Q value should be in the range from 3.0 to 5.0. A Q value of lower than 3.0 may degrade the appearance, especially flow mark of moldings, while the value over 5.0 may result in reduced tensile elongation of the composition and produce perceptible weld lines on the injection moldings.

The crystalline polypropylene moiety should have a content of fraction soluble in xylene at 20° C. of not higher than 1.5% by weight, preferably not higher than 1.2% by weight. If the content is in excess of 1.5% by weight, the resultant composition may be degraded in coatability.

Olefin copolymer rubbers to be used in the ethylene-α olefin copolymer rubbers (B) of the present invention may be amorphous random copolymer elastomers comprising primarily olefin components such as ethylene-propylene copolymer rubbers, ethylene-propylene-non-conjugated diene rubbers, ethylene-butene-1 copolymer rubbers, ethylene-butene-non-conjugated rubbers, and propylene-butadiene copolymer rubbers. The non-conjugated dienes include dicyclopentadiene, 1,4-hexadiene, cyclooctadiene, methylnorbornene and ethylidene-norbornene, and especially ethylidene-norbornene is preferred.

The ethylene-α olefin copolymer rubbers (B) may be used in a mixture of two or more types depending upon the flowability, rigidity, heat resistance, impact strength at low temperatures, appearance of moldings, coating adherence and the like to be improved of the composition.

The Mooney viscosity $ML_{1+4}$ measured at 100° C. of ethylene-α olefin copolymer rubbers (B) used in the present invention should be in the range of 8 to 100, preferably 10 to 85. A Mooney viscosity of less than 8 may result in reduced impact strength at low temperatures and degraded appearance of moldings, particularly weld irregularity. A Mooney viscosity in excess of 100 may result in an reduction in the adherence of coatings onto moldings. The amount of α olefin in the ethylene-α olefin copolymer rubbers should be in the range from 10 to 55% by weight. If it is less than 10% by weight, the coating adherence may be lowered, while if it is over 55% by weight, the rigidity, heat resistance and appearance may be reduced.

When a small amount of non-conjugated diene monomer is copolymerized with ethylene-α olefin copolymer rubbers (B), an iodine value of higher than 20 may lead to degraded appearance of moldings, particularly flow mark.

The proportion of the ethylene-α olefin copolymer rubbers (B) to be incorporated in the polypropylene resin composition of the present invention should be in the range from 5 to 30% by weight, preferably 10 to 25% by weight. If it is lower than the defined range, the impact strength at low temperatures and coating adherence may be reduced. If it is higher than the defined range, the rigidity, heat resistance, and appearance, especially flow mark may be degraded.

The ethylene-butene-1 copolymers (C) to be used in the present invention should have the following characteristics:

(C1) a density of 0.870 to 0.915 g/cm³, (C2) a melt index at 190° C. of 5 to 30 g/10 minutes, and (C3) a melt peak at 100° C. or higher as determined in the thermogram with increasing temperature by a Differential Scanning Calorimeter (DSC), The ethylene-butene-1 copolymers (C) have effects to improve mechanical strength and coatability, and should have a density of 0.870 to 0.915 g/cm³, preferably 0.880 to 0.910 g/cm³. A density lower than 0.870 g/cm³ may result in reduced rigidity, while a density higher than 0.915 g/cm³ may result in reduced impact strength at low temperatures and coatability.

The ethylene-butene-1 copolymers (C) should have a melt index at 190° C. of 5 to 30 g/10 minutes. If the melt index is lower than 5 g/10 minutes, the coating adherence may be degraded, while if it is higher than 30 g/10 minutes, the impact strength at low temperatures may be reduced.

The ethylene-butene-1 copolymers (C) should have a melt peak at 100° C. or higher as determined in the thermogram with increasing temperature by a Differential Scanning Calorimeter (DSC). If the maximum melting peak temperature is lower than 100° C., the heat resistance and flow mark may be degraded.

The proportion of the ethylene-butene-1 copolymers (C) to be incorporated in the present invention should be in the range from 3 to 20% by weight, preferably 5 to 15% by weight. A proportion of less than 3% by weight may reduce the coatability, while that exceeding 20% by weight may result in reduced impact strength at low temperatures, appearance (flow mark, weld) and coatability.

The inorganic fillers (D) to be used in the present invention include talc, mica, wollastonite, calcium carbonate, barium sulfate, magnesium carbonate, clay, alumina, silica, calcium sulfate, carbon fibers, metal fibers, siliceous sand, quartzite, carbon black, titanium oxide, magnesium hydroxide, asbestos, zeolite, molybdenum, diatomaceous earth, sericite, SHILAS, calcium hydroxide, calcium sulfite, sodium sulfate, bentonite and graphite.

The proportion of inorganic fillers (D) to be incorporated in the polypropylene resin composition of the present invention should be in the range from 0 to 20% by weight, and they may be incorporated when improved rigidity, heat resistance and dimension consistency are required. It should be in mind, however, that a proportion of over than 20% by weight may cause a degradation in formability, impact strength at low temperatures, and appearance of moldings flow mark, weld).

The inorganic fillers (D) should preferably be talc particles having an average particle size of 3 μ or less in order to improve the rigidity, heat resistance, impact strength at low temperatures, and appearance of moldings.

The resin composition of the present invention may be prepared by using a kneading apparatus such as a single or twin screw extruder, Banbury mixer, or hot rollers. The temperature required for the kneading should be in the range from 160° to 260° C. for 1 to 20 minutes. Moreover, in the kneading step, there may be incorporated at least one of additives such as antioxidant, UV absorbers, slipping agents, pigments, antistatic agents, copper harm inhibitors, flame retardants, neutralizing agents, foaming agents, plasticizers, nucleating agents and the like in the range that the objects of the present invention are not inhibited.

EXAMPLES

The present invention will be illustrated with reference to Examples and Comparative Examples hereunder, without being limited thereto, so long as they are not exceeding the gist of the present invention.

First, procedures for measurement of physical properties referred to in Examples and Comparative Examples are described.

(1) Melt index

According to the procedure defined in JIS K6758. Measurement was made at a temperature of 230° C. under a load of 2.16 kg unless otherwise indicated.

(2) Tensile test

According to the procedure defined in ASTM D638. Specimens obtained by injection molding were used. The specimens had a thickness of 3.2 mm and evaluated for tensile yield point strength and tensile elongation at a pulling speed of 50 mm/min. The temperature was 23° C. unless otherwise indicated.

(3) Flexure test

According to the procedure defined in JIS K7203. Specimens obtained by injection molding were used. The specimens had a thickness of 6.4 mm and a span length of 100 mm and evaluated for modulus of flexural elasticity and flexure strength at a loading speed of 2.0 mm/minute. The temperature was 23° C. unless otherwise indicated. When the specimens were at other temperatures, they were conditioned for 30 minutes in a thermostat at a predetermined temperature before measuring.

(4) Izot impact strength

According to the procedure defined in JIS K7110. Specimens obtained by injection molding were used. The specimens had a thickness of 3.2 mm and evaluated for notched impact strength after molded and notched. When the temperature was −30° C., the specimens were conditioned for 2 hours in a thermostat at a predetermined temperature before measuring.

(5) Deflection test under load

According to the procedure defined in JIS K7207. The fiber stress was measured at 4.6 kg/cm$^2$.

(6) Appearance

A plate having dimensions of 100 mm wide×400 mm long×3 mm thick was used, and articles molded by single point side gate from one side of the 100 mm width were evaluated for flow mark by naked eye. In addition, articles molded by two point side gate from one side of the 100 width were evaluated for weld appearance by naked eye.

Evaluations of the flow mark and the weld appearance were rated by the figure "◯" for unperceptible and the figure "×" for perceptible.

(7) Coatability

Evaluation of appearance was made for the identical plates to those which had been used for the evaluation of flow mark. Specimens used were prepared only by air-blowing without pretreatment after molding and leaving to stand for one day. The plates used for evaluating coating quality were prepared with careful attention to avoid leaving fingerprint and depositing a releasing agent. Coating was made using a spray gun to apply a primer available from NIPPON BEE CEMICAL Co., Ltd. under the tradename "RB147" to a thickness of 5 to 10 μ, and the applied coatings were baked by a drier at 90° C. for 30 minutes. Thereafter, an intermediate coating with a two-parts urethane paint available from NIPPON BEE CEMICAL Co., Ltd. under the tradename "R271" was applied to a thickness of 30 to 35 μ, then baked by a drier at 90° C. for 30 minutes, allowed to stand for one whole day at room temperature, and then each specimen was subjected to the adherence test. The adherence test was made according to the cross cut adhesion test where an adhesive tape available from Nichiban Co. under the tradename "Cellotape" having a width of 24 mm was attached on the 1 mm square cross cut surface and peeled off at an angle of 90° to determine the proportion (%) of the squares remained intact.

Components A, B, C, and D used in Examples and Comparative Examples were summarized in Tables 1 to 4 under.

TABLE 1

| | Crystalline ethylene propylene block copolymer (A) | | | | |
|---|---|---|---|---|---|
| | Crystalline polypropylene moiety | | | Ethylene propylene random copolymer moiety | |
| No. | [η]p | Q value | Xylene solubles (% by weight) | Amount in the copolymer (A) (% by weight) | Ethylene/propylene (by weight) |
| A-1 | 1.34 | 3.5 | 0.9 | 21 | 38/72 |
| A-2 | 1.02 | 3.4 | 0.9 | 12 | 28/62 |
| A-3 | 1.31 | 7.2 | 1.4 | 16 | 37/63 |
| A-4 | 1.06 | 3.6 | 3.3 | 14 | 35/65 |
| A-5 | 1.01 | 3.5 | 0.9 | 3 | 40/60 |
| A-6 | 1.08 | 3.7 | 1.1 | 40 | 38/62 |
| A-7 | 1.14 | 3.5 | 1.0 | 14 | 70/30 |
| A-8 | 2.41 | 3.7 | 1.0 | 13 | 34/66 |
| A-9 | 0.67 | 3.5 | 0.9 | 12 | 42/58 |

TABLE 2

| | Ethylene-α olefin copolymer rubber (B) | | | |
|---|---|---|---|---|
| No. | $ML_{1+4}$ at 100° C. | Amount of α olefin | | Iodine value |
| B-2 | 45 | propylene | 28 | — |
| B-4 | 125 | propylene | 30 | — |
| B-5 | 70 | propylene | 65 | — |
| B-1 | 30 | propylene | 30 | 10 |
| B-3 | 10 | butene-1 | 17 | — |

TABLE 3

| | Ethylene-butene-1 copolymer (C) | | |
|---|---|---|---|
| No. | Density (g/cm$^3$) | Melt index (g/10 minutes) | Melt peak at 100° C. or higher (°C.) |
| C-1 | 0.907 | 17 | 117 |
| C-2 | 0.923 | 10 | 123 |
| C-3 | 0.905 | 2 | 115 |
| C-4 | 0.895 | 18 | 70 |

TABLE 4

| Filler | Inorganic filler (D) Average particle size (μm) |
|---|---|
| Talc - A | 2.2 |
| Talc - B | 4.1 |
| Calcium carbonate | 1.9 |
| Precipitated barium sulfate | 0.8 |
| Calcium silica | 8.2 |

Examplees 1 to 12 and Comparative Examples 1 to 30

Components A to C, or A to D were formulated as indicated in Tables 6, 8 and 10, blended by a Henschel mixer, and then melt-kneaded with a 44 mm twin screw extruder at 220° C. to produce pellets. The pellets were injection molded under molding conditions A and B shown in Table 5 to produce test specimens and plates as samples for evaluation. The results of evaluation are given in Tables 7, 9 and 11.

TABLE 5

| | Conditions of preparing samples for evaluation | |
|---|---|---|
| | Molding condition A | Molding condition B |
| Injection molding machine | Toshiba IS150E (available Toshiba Machine Co., Ltd.) | NEOMAT 515/150 (available from Sumitomo Heavy Industries, Ltd.) |
| Mold | Test specimen Specimen for tensile test Specimen for flexure test Specimen for Izod impact test | Plate, 100 × 400 × 3 m/m Single point or two point gate |
| Temperature | 220° C. | 220° C. |
| Primary pressure, time | 550 kg/cm², 5 sec. | 700 kg/cm², 5 sec. |
| Secondary pressure, time | 300 kg/cm², 10 sec. | 500 kg/cm², 10 sec. |
| Cooling time | 30 seconds | 30 seconds |
| Temperature of metal mold | 50° C. | 50° C. |
| Screw revolution | 87 rpm. | 80 rpm. |

TABLE 6

| | Component A | Parts by weight | Component B | Parts by weight | Component C | Parts by weight | Component D | Parts by weight |
|---|---|---|---|---|---|---|---|---|
| Example 1 | A-1 | 78 | B-1 | 14 | C-1 | 8 | — | — |
| Example 2 | A-2 | 78 | B-1 | 14 | C-1 | 8 | — | — |
| Comp. Ex. 1 | A-3 | 78 | B-1 | 14 | C-1 | 8 | — | — |
| Comp. Ex. 2 | A-4 | 78 | B-1 | 14 | C-1 | 8 | — | — |
| Comp. Ex. 3 | A-5 | 78 | B-1 | 14 | C-1 | 8 | — | — |
| Comp. Ex. 4 | A-6 | 78 | B-1 | 14 | C-1 | 8 | — | — |
| Comp. Ex. 5 | A-7 | 78 | B-1 | 14 | C-1 | 8 | — | — |
| Comp. Ex. 6 | A-8 | 78 | B-1 | 14 | C-1 | 8 | — | — |
| Comp. Ex. 7 | A-9 | 78 | B-1 | 14 | C-1 | 8 | — | — |
| Example 3 | A-1 | 67 | B-2 | 19 | C-1 | 6 | Talc-A | 8 |
| Example 4 | A-2 | 67 | B-2 | 19 | C-1 | 6 | Talc-A | 8 |
| Comp. Ex. 8 | A-3 | 67 | B-2 | 19 | C-1 | 6 | Talc-A | 8 |
| Comp. Ex. 9 | A-4 | 67 | B-2 | 19 | C-1 | 6 | Talc-A | 8 |
| Comp. Ex. 10 | A-5 | 67 | B-2 | 19 | C-1 | 6 | Talc-A | 8 |
| Comp. Ex. 11 | A-6 | 67 | B-2 | 19 | C-1 | 6 | Talc-A | 8 |
| Comp. Ex. 12 | A-7 | 67 | B-2 | 19 | C-1 | 6 | Talc-A | 8 |
| Comp. Ex. 13 | A-8 | 67 | B-2 | 19 | C-1 | 6 | Talc-A | 8 |
| Comp. Ex. 14 | A-9 | 67 | B-2 | 19 | C-1 | 6 | Talc-A | 8 |

TABLE 7

|  | Melt index (g/10 min.) | Tensile strength yield stress (MPa) | Elongation at break (%) | Modulus of flexural elasticity (MPa) | Flexure strength (MPa) |
|---|---|---|---|---|---|
| Example 1 | 9.3 | 13.8 | >500 | 700 | 15.2 |
| Example 2 | 28 | 20.0 | 450 | 1250 | 24.0 |
| Comp. Ex. 1 | 14 | 16.5 | 150 | 1040 | 20.4 |
| Comp. Ex. 2 | 28 | 17.1 | >500 | 1080 | 20.8 |
| Comp. Ex. 3 | 29 | 21.8 | 310 | 1390 | 25.5 |
| Comp. Ex. 4 | 11 | 7.1 | >500 | 480 | 10.3 |
| Comp. Ex. 5 | 25 | 21.2 | 330 | 1440 | 25.6 |
| Comp. Ex. 6 | 1.1 | 21.1 | >500 | 1120 | 23.8 |
| Comp. Ex. 7 | 51 | 22.2 | 60 | 1420 | 25.9 |
| Example 3 | 8.9 | 14.5 | >500 | 880 | 18.1 |
| Example 4 | 21 | 21.5 | 400 | 1350 | 26.3 |
| Comp. Ex. 8 | 11 | 18.4 | 70 | 1180 | 23.5 |
| Comp. Ex. 9 | 19 | 18.9 | 450 | 1100 | 22.9 |
| Comp. Ex. 10 | 23 | 23.3 | 220 | 1580 | 27.9 |
| Comp. Ex. 11 | 8.8 | 7.9 | >500 | 570 | 12.8 |
| Comp. Ex. 12 | 21 | 23.0 | 240 | 1610 | 28.8 |
| Comp. Ex. 13 | 0.8 | 23.5 | >500 | 1250 | 25.7 |
| Comp. Ex. 14 | 32 | 24.1 | 50 | 1650 | 29.0 |

|  | Izod impact strength at −30° C. (J/m) | Temperature of deflection under load (°C.) | Flow mark | Weld | Coating adherence (%) |
|---|---|---|---|---|---|
| Example 1 | 100 | 85 | ○ | ○ | 100 |
| Example 2 | 65 | 101 | ○ | ○ | 100 |
| Comp. Ex. 1 | 78 | 93 | ○ | x | 95 |
| Comp. Ex. 2 | 70 | 95 | ○ | ○ | 80 |
| Comp. Ex. 3 | 35 | 112 | ○ | ○ | 75 |
| Comp. Ex. 4 | NB | 72 | x | ○ | 100 |
| Comp. Ex. 5 | 41 | 104 | x | ○ | 84 |
| Comp. Ex. 6 | 120 | 84 | x | ○ | 83 |
| Comp. Ex. 7 | 28 | 105 | ○ | ○ | 76 |
| Example 3 | 110 | 96 | ○ | ○ | 100 |
| Example 4 | 66 | 111 | ○ | ○ | 100 |
| Comp. Ex. 8 | 71 | 107 | ○ | x | 91 |
| Comp. Ex. 9 | 75 | 101 | ○ | ○ | 82 |
| Comp. Ex. 10 | 30 | 120 | ○ | ○ | 88 |
| Comp. Ex. 11 | NB | 79 | x | ○ | 96 |
| Comp. Ex. 12 | 40 | 113 | x | ○ | 58 |
| Comp. Ex. 13 | 110 | 89 | x | ○ | 76 |
| Comp. Ex. 14 | 25 | 117 | ○ | ○ | 49 |

NB not broken down

TABLE 8

|  | Formation | | | | | | | |
|---|---|---|---|---|---|---|---|---|
|  | Component A | Parts by weight | Component B | Parts by weight | Component C | Parts by weight | Component D | Parts by weight |
| Example 5 | A-1 | 78 | B-2 | 14 | C-1 | 8 | — | — |
| Comp. Ex. 15 | A-1 | 92 | — | — | C-1 | 8 | — | — |
| Comp. Ex. 16 | A-1 | 57 | B-2 | 35 | C-1 | 8 | — | — |
| Comp. Ex. 17 | A-1 | 78 | B-4 | 14 | C-1 | 8 | — | — |
| Comp. Ex. 18 | A-1 | 78 | B-5 | 14 | C-1 | 8 | — | — |
| Example 6 | A-1 | 78 | B-3 | 14 | C-1 | 8 | — | — |
| Comp. Ex. 19 | A-1 | 86 | B-2 | 14 | — | — | — | — |
| Comp. Ex. 20 | A-1 | 61 | B-2 | 14 | C-1 | 25 | — | — |
| Comp. Ex. 21 | A-1 | 78 | B-2 | 14 | C-2 | 8 | — | — |
| Comp. Ex. 22 | A-1 | 78 | B-2 | 14 | C-3 | 8 | — | — |
| Comp. Ex. 23 | A-1 | 78 | B-2 | 14 | C-4 | 8 | — | — |

TABLE 9

|  | Melt index (g/10 min.) | Tensile strength yield stress (MPa) | Elongation at break (%) | Modulus of flexural elasticity (MPa) | Flexure strength (MPa) |
|---|---|---|---|---|---|
| Example 5 | 8.6 | 15.0 | >500 | 800 | 16.3 |
| Comp. Ex. 15 | 16 | 18.7 | 450 | 1060 | 20.1 |
| Comp. Ex. 16 | 4.3 | 7.0 | >500 | 510 | 11.2 |
| Comp. Ex. 17 | 3.1 | 14.3 | 400 | 880 | 17.0 |
| Comp. Ex. 18 | 6.8 | 8.4 | >500 | 580 | 12.3 |
| Example 6 | 9.8 | 16.7 | >500 | 880 | 17.4 |
| Comp. Ex. 19 | 8.0 | 16.8 | 400 | 910 | 17.6 |
| Comp. Ex. 20 | 19 | 18.8 | >500 | 1020 | 20.3 |
| Comp. Ex. 21 | 9.2 | 15.1 | 400 | 790 | 16.1 |
| Comp. Ex. 22 | 8.8 | 15.3 | >500 | 880 | 17.2 |
| Comp. Ex. 23 | 11 | 9.6 | >500 | 620 | 13.0 |

|  | Izod impact strength at −30° C. (J/m) | Temperature of deflection under load (°C.) | Flow mark | Weld | Coating adherence (%) |
|---|---|---|---|---|---|
| Example 5 | 120 | 87 | ○ | ○ | 100 |
| Comp. Ex. 15 | 38 | 119 | ○ | ○ | 36 |
| Comp. Ex. 16 | NB | 70 | x | x | 82 |
| Comp. Ex. 17 | 120 | 88 | x | ○ | 82 |
| Comp. Ex. 18 | NB | 85 | x | x | 91 |
| Example 6 | 110 | 90 | ○ | ○ | 100 |
| Comp. Ex. 19 | 100 | 92 | ○ | ○ | 85 |
| Comp. Ex. 20 | 45 | 93 | x | x | 76 |
| Comp. Ex. 21 | 75 | 86 | ○ | ○ | 88 |
| Comp. Ex. 22 | 120 | 87 | ○ | ○ | 89 |
| Comp. Ex. 23 | NB | 84 | x | ○ | 95 |

NB not broken down

TABLE 10

|  | Formation | | | | | | | |
|---|---|---|---|---|---|---|---|---|
|  | Component A | Parts by weight | Component B | Parts by weight | Component C | Parts by weight | Component D | Parts by weight |
| Example 7 | A-2 | 67 | B-3 | 19 | C-1 | 6 | Talc-A | 8 |
| Comp. Ex. 24 | A-2 | 51 | B-2 | 35 | C-1 | 6 | Talc-A | 8 |
| Comp. Ex. 25 | A-2 | 67 | B-4 | 19 | C-1 | 6 | Talc-A | 8 |
| Comp. Ex. 26 | A-2 | 67 | B-5 | 19 | C-1 | 6 | Talc-A | 8 |
| Comp. Ex. 27 | A-2 | 48 | B-2 | 19 | C-1 | 25 | Talc-A | 8 |
| Comp. Ex. 28 | A-2 | 67 | B-2 | 19 | C-2 | 6 | Talc-A | 8 |
| Comp. Ex. 29 | A-2 | 67 | B-2 | 19 | C-3 | 6 | Talc-A | 8 |
| Comp. Ex. 30 | A-2 | 67 | B-2 | 19 | C-4 | 6 | Talc-A | 8 |
| Example 8 | A-2 | 67 | B-2 B-3 | 13 6 | C-1 | 6 | Talc-A | 8 |
| Example 9 | A-2 | 67 | B-2 | 19 | C-1 | 6 | Talc-B | 8 |
| Example 10 | A-2 | 67 | B-2 | 19 | C-1 | 6 | Calcium carbonate | 8 |
| Example 11 | A-2 | 67 | B-2 | 19 | C-1 | 6 | Barium sulfate | 8 |
| Example 12 | A-2 | 67 | B-2 | 19 | C-1 | 6 | calcium silicate | 8 |

TABLE 11

| | Melt index (g/10 min.) | Tensile strength yield stress (MPa) | Elongation at break (%) | Modulus of flexural elasticity (MPa) | Flexure strength (MPa) |
| --- | --- | --- | --- | --- | --- |
| Example 7 | 23 | 22.6 | 450 | 1470 | 27.5 |
| Comp. Ex. 24 | 12 | 7.1 | >500 | 510 | 11.4 |
| Comp. Ex. 25 | 8.4 | 20.8 | 310 | 1380 | 26.4 |
| Comp. Ex. 26 | 13 | 14.5 | >500 | 990 | 19.9 |
| Comp. Ex. 27 | 29 | 22.9 | >500 | 1520 | 28.0 |
| Comp. Ex. 28 | 22 | 21.8 | 300 | 1330 | 26.0 |
| Comp. Ex. 29 | 18 | 22.0 | 350 | 1380 | 26.8 |
| Comp. Ex. 30 | 25 | 14.0 | >500 | 980 | 20.2 |
| Example 8 | 21 | 22.5 | 450 | 1380 | 27.0 |
| Example 9 | 22 | 21.3 | 100 | 1320 | 26.0 |
| Example 10 | 20 | 17.9 | >500 | 1190 | 23.1 |
| Example 11 | 22 | 17.1 | >500 | 1110 | 22.2 |
| Example 12 | 21 | 18.8 | 400 | 1200 | 23.5 |

| | Izod impact strength at −30° C. (J/m) | Temperature of deflection under load (°C.) | Flow mark | Weld | Coating adherence (%) |
| --- | --- | --- | --- | --- | --- |
| Example 7 | 60 | 113 | O | O | 100 |
| Comp. Ex. 24 | NB | 80 | x | O | 88 |
| Comp. Ex. 25 | 70 | 110 | x | O | 78 |
| Comp. Ex. 26 | 110 | 98 | x | x | 75 |
| Comp. Ex. 27 | 30 | 109 | x | x | 70 |
| Comp. Ex. 28 | 48 | 111 | O | O | 80 |
| Comp. Ex. 29 | 71 | 112 | O | O | 76 |
| Comp. Ex. 30 | 120 | 103 | x | O | 92 |
| Example 8 | 62 | 118 | O | O | 100 |
| Example 9 | 60 | 117 | O | O | 100 |
| Example 10 | 68 | 109 | O | O | 100 |
| Example 11 | 67 | 108 | O | O | 100 |
| Example 12 | 60 | 112 | O | O | 100 |

NB not broken down

As described above, the present invention provides a polypropylene resin composition which exhibits an excellent coating adherence, high rigidity, high impact strength at low temperatures, prominent heat resistance and excellent appearance of moldings even without effecting a treatment with trichloroethane as pretreatment step before coating.

What is claimed is:

1. A polypropylene resin composition comprising:

30 to 92% by weight crystalline ethylene propylene block copolymer (A) comprising a crystalline polypropylene moiety and an ethylene-propylene random copolymer moiety having a ratio of ethylene/propylene in a range of 20/80 to 60/40 by weight, wherein said crystalline polypropylene moiety has a limiting viscosity $[\eta]_p$ of 0.8 to 2.0 dl/g and a ratio of molecular weight distribution, Q value=weight average molecular weight Mw/number average molecular weight Mn, of 3.0 to 5.0 as determined by GPC, and a content of solubles in xylene at 20° C. of not higher than 1.5% by weight, and wherein said ethylene-propylene random copolymer moiety is present in an amount of 7 to 25% by weight of said crystalline ethylene propylene block copolymer (A);

5 to 30% by weight ethylene-α olefin copolymer rubber (B) which is an amorphous random copolymer elastomer having a Mooney viscosity $ML_{1+4}$ measured at 100° C. of 8 to 100 and a content of α-olefin of 10 to 55% by weight;

3 to 20% by weight ethylene-butene-1 copolymer (C) having (C1) a density of 0.870 to 0.915 g/cm$^3$, (C2) a melt index at 190° C. of 5 to 30 g/10 minutes, and (C3) a melt peak at 100° C. or higher as determined in the thermogram with increasing temperature by a Differential Scanning Calorimeter; and 0 to 20% by weight inorganic filler (D).

2. The polypropylene resin composition according to claim 1, wherein said inorganic filler (D) is particulate talc having an average particle size of 3 μ or less.

3. The polypropylene resin composition according to claim 1, wherein, in said crystalline ethylene propylene block copolymer (A), said ethylene-propylene random copolymer moiety has a ratio of ethylene to propylene in a range of 20/80 to 50/50, by weight.

4. The polypropylene resin composition according to claim 1, wherein said crystalline polypropylene moiety has a content of solubles in xylene at 20° C. of not higher than 1.2% by weight.

5. The polypropylene resin composition according to claim 1, wherein the Mooney viscosity $ML_{1+4}$ of said ethylene-α olefin copolymer rubber (B) is in the range of 10 to 85.

6. The polypropylene resin composition according to claim 1, wherein the content of the ethylene-butene-1 copolymer (C) is in the range of 5 to 15% by weight.

* * * * *